(12) United States Patent
Blanchon et al.

(10) Patent No.: US 9,069,087 B2
(45) Date of Patent: Jun. 30, 2015

(54) METHOD FOR CONTROLLING A PHOTODETECTOR BY AUTOMATICALLY DETECTING INCIDENT RADIATION

(75) Inventors: David Blanchon, Saint Paul de Varces (FR); David Couder, Grenoble (FR); Benoît Candiard, Voreppe (FR)

(73) Assignee: Trixell, Moirans (FR)

( * ) Notice: Subject to any disclaimer, the term of this patent is extended or adjusted under 35 U.S.C. 154(b) by 0 days.

(21) Appl. No.: 14/232,208

(22) PCT Filed: Jul. 9, 2012

(86) PCT No.: PCT/EP2012/063416
§ 371 (c)(1),
(2), (4) Date: Apr. 23, 2014

(87) PCT Pub. No.: WO2013/007695
PCT Pub. Date: Jan. 17, 2013

(65) Prior Publication Data
US 2015/0034833 A1 Feb. 5, 2015

(30) Foreign Application Priority Data
Jul. 13, 2011 (FR) ..................................... 11 56419

(51) Int. Cl.
| | |
|---|---|
| *G01T 1/24* | (2006.01) |
| *H04N 5/232* | (2006.01) |
| *H04N 5/32* | (2006.01) |
| *H04N 5/353* | (2011.01) |
| *H04N 5/374* | (2011.01) |

(52) U.S. Cl.
CPC ................ *G01T 1/241* (2013.01); *H04N 5/232* (2013.01); *H04N 5/32* (2013.01); *H04N 5/353* (2013.01); *H04N 5/374* (2013.01)

(58) Field of Classification Search
CPC .................. H01L 27/14603; H01L 27/14676; H01L 27/14658; G01T 1/247; G01T 1/241; G01T 1/24
USPC ....................................................... 250/370.11
See application file for complete search history.

(56) References Cited

U.S. PATENT DOCUMENTS 5,962,856 A * 10/1999 Zhao et al. ............... 250/370.09
2003/0194058 A1 10/2003 Tsujii (Continued)

FOREIGN PATENT DOCUMENTS

EP 1401193 A2 3/2004

*Primary Examiner* — Marcus Taningco
(74) *Attorney, Agent, or Firm* — Baker & Hostetler LLP (57) ABSTRACT

A method is provided for controlling a light-sensitive device, for example, a digital X-ray detector including an array of light-sensitive points. The light-sensitive device includes a column conductor, line conductors, and light-sensitive points. Each light-sensitive point is connected between the column conductor and one of the line conductors, and includes a light-sensitive element converting a photon flux into electrical charges, and a transistor transferring the electrical charges to the column conductor based on control of a signal received by the corresponding line conductor. The method depends on the presence of a capacitor for cross-coupling between the drain and source of each transistor in the off state. The capacitor provides a potential variation to the column conductor upon receiving photons. The method comprises comparing the potential variation with a threshold, and reading the light-sensitive points in the event that the result of the comparison is positive.

12 Claims, 7 Drawing Sheets

(56) References Cited

U.S. PATENT DOCUMENTS

| | | |
|---|---|---|
| 2004/0130627 A1 | 7/2004 | Braune |
| 2007/0291904 A1* | 12/2007 | Takenaka et al. ............. 378/207 |
| 2008/0210946 A1* | 9/2008 | Okada et al. .................... 257/71 |
| 2010/0001194 A1* | 1/2010 | Ishii et al. ................ 250/370.08 |

* cited by examiner

METHOD FOR CONTROLLING A PHOTODETECTOR BY AUTOMATICALLY DETECTING INCIDENT RADIATION

CROSS-REFERENCE TO RELATED APPLICATION

This application is a National Stage of International patent application PCT/EP2012/063416, filed on Jul. 9, 2012, which claims priority to foreign French patent application No. FR 1156419, filed on Jul. 13, 2011, the disclosures of which are incorporated by reference in their entirety.

FIELD OF THE INVENTION

The invention relates to a method for controlling a photosensitive device, for example a digital X-ray detector comprising a matrix of photosensitive points. In particular, it relates to a method for controlling the reading of electrical charges accumulated in the photosensitive points of the device. The invention applies also to the determination of a quantity of photons received by the photosensitive device.

BACKGROUND

The techniques of thin-film deposition of semiconductor materials, such as hydrogenated amorphous silicon, on insulating substrates, for example made of glass, make it possible to produce photosensitive devices formed by a matrix of points sensitive to visible or near-visible radiation. These photosensitive devices are called solid state detectors, semiconductor detectors or even flat panel detectors. They can be used in the context of the formation of radiological images by X-rays by interposing a scintillator between the X-radiation and the matrix of photosensitive points, so as to convert the X-radiation into light radiation in the band of wavelengths of the photosensitive points. Each photosensitive point generally at least consists of a photosensitive element such as a diode and a switch element in series, for example a field-effect transistor. Each photosensitive point is connected between a column conductor and a row conductor. During a so-called imaging phase, the photosensitive elements are exposed to a radiation that they convert into electrical charges. During a so-called reading phase, a read pulse is successively applied to the switch elements by the row conductors in order to transfer the electrical charges to read circuits via the column conductors. For medical radiology, photosensitive devices have been produced in the form of cassettes used in conjunction with a base station comprising a source of X-radiation. The cassettes can be movable in order to be easily placed in proximity to a patient of whom a radiological image is to be obtained. The solid state detectors have numerous advantages over radiological films, notably in terms of analysis of the images. However, a synchronization is generally necessary between the base station and the cassette in order to synchronize the acquisition window, that is to say the time interval during which the solid state detector can convert the photons received, with the radiation window, that is to say the time interval during which X-rays are emitted by the base station. In practice, in the absence of synchronization, the radiation window can begin before the acquisition window or end afterwards. The patient is then unnecessarily subjected to a dose of X-rays. Furthermore, the exposure of the photosensitive points to a radiation during the reading phase degrades the quality of the radiological image. Thus, the synchronization makes it possible to check that all of the radiation window is included in the acquisition window, all of the X-radiation emitted by a base station then being able to be processed by the movable cassette. The synchronization therefore demands the presence of link means between the base station and the cassette. Now, the base stations originally provided to operate with radiological film cassettes include no such link means. The replacement of a radiological film cassette with a cassette comprising a solid state detector therefore requires structural changes to the base station. These structural changes cause the complexity of the radiological system to be increased and add costs to the installation. Furthermore, the link means exhibit drawbacks. In particular, a wired link means restricts the mobility of a movable cassette. A wireless link allows more mobility but does not generally allow for synchronization. Such is notably the case with the wireless links based on the IEEE 802.11 standard. Furthermore, the electromagnetic compatibility constraints in the medical field demand very low emission powers. Problems of reliability of the wireless link then arise.

SUMMARY OF THE INVENTION

One aim of the invention is notably to remedy all or some of the abovementioned drawbacks by allowing a photosensitive device to process all of a radiation received without requiring link means with the radiation source. The invention notably makes it possible to detect the arrival of photons on the photosensitive device without requiring any additional sensor and without undertaking a reading phase, that is to say without applying read pulses to the switch elements of the photosensitive elements. To this end, the subject of the invention is a method for controlling a photosensitive device comprising a column conductor, row conductors and photosensitive points, each photosensitive point being linked between the column conductor and one of the row conductors, and comprising a photosensitive element suitable for converting a photon stream into electrical charges, and a transistor controlled by the corresponding row conductor, the transistors being controlled in the off state during an acquisition phase in which the photon stream is converted into electrical charges, and being successively controlled in the on state during a reading phase so as to transfer, row by row, the electrical charges to the column conductor. Each transistor introduces, in the off state, a stray coupling capacitance between the corresponding photosensitive element and column conductor. The method is characterized in that it comprises a step consisting in determining an electrical potential on the column conductor at an instant when the transistors are controlled in the off state.

According to a first particular embodiment, the method comprises the following additional steps:

determining the electrical potential on the column conductor at a second instant when the transistors are controlled in the off state, determining a difference in the electrical potential on the column conductor between the first and second instants, comparing the electrical potential difference with a predetermined threshold, if the electrical potential difference is greater than the predetermined threshold, successively controlling the transistors so as to individually transfer the electrical charges of each photosensitive point to the column conductor.

This particular embodiment makes it possible to detect a trend of the electrical potential between two instants, and initiate the reading of the electrical charges in the event of a significant change.

According to a second particular embodiment, the photosensitive device comprises $n_c$ column conductors, each photosensitive point being linked between one of the column conductors and one of the row conductors so as to form a matrix of photosensitive points, the electrical potential being determined $n_l$ times in succession on each of the column conductors in a first time interval when the transistors are controlled in the off state, the potentials forming a first series of potentials for each column conductor.

The method also comprises the following steps:

determining the electrical potential $n_l$ times in succession on each of the column conductors in a second time interval when the transistors are controlled in the off state, the potentials forming a second series of potentials for each column conductor, determining, in relation to each column conductor and to each occurrence in the series of potentials, a potential difference between the electrical potential of the first series and the corresponding electrical potential of the second series, the potential differences forming a test image of $n_c$ columns by $n_l$ rows of pixels, testing the exposure of the photosensitive points, said step comprising the following successive substeps:

subdividing the test image into blocks of m columns by $n_l$ rows of pixels, determining, for each block, an average of the potential differences, comparing each average with a predetermined threshold that is a function of the dimension m of the blocks, if no average is greater than the predetermined threshold, repeating the test step with a block dimension m greater than the preceding dimension m, if at least one average is greater than the predetermined threshold, successively controlling the transistors so as to individually transfer the electrical charges of each photosensitive point to the corresponding column conductor.

This particular embodiment makes it possible to optimize the detection of an exposure of the photosensitive device regardless of the width of the exposed zone.

The invention notably has the advantage that it makes it possible to replace any type of movable cassette in a radiological system without requiring any structural modification.

BRIEF DESCRIPTION OF THE DRAWINGS

The invention will be better understood and other advantages will become apparent on reading the following description, given in light of the appended drawings in which.

DETAILED DESCRIPTION

Figure 1:
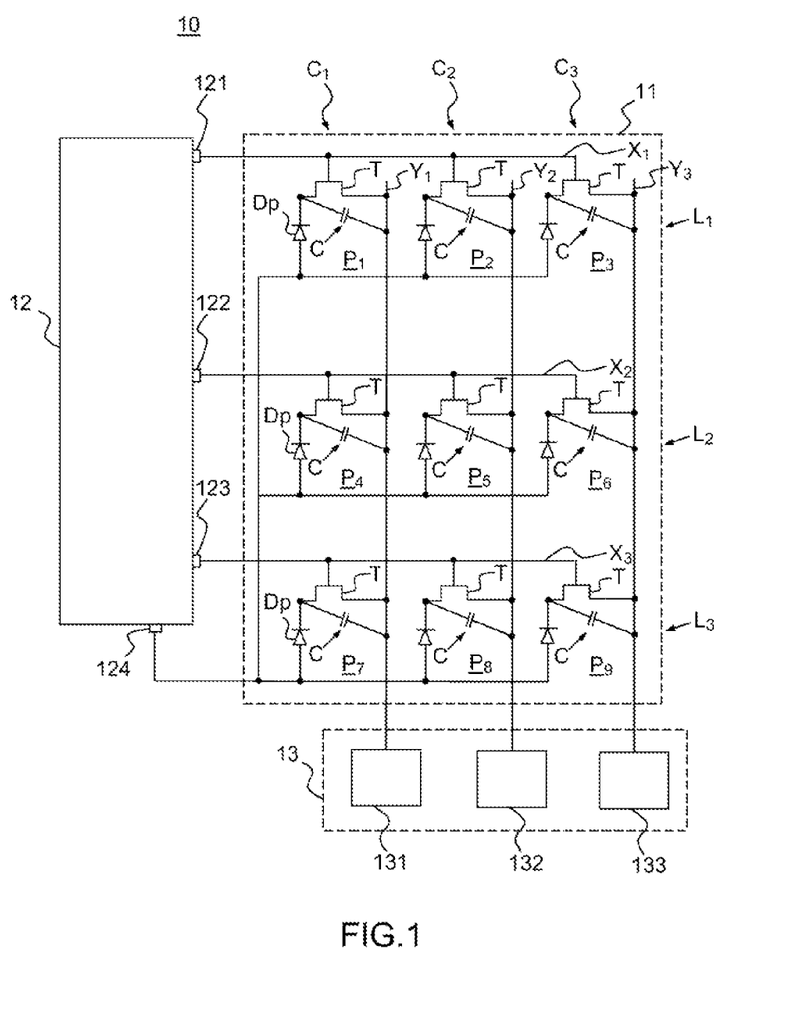
FIG. 1 represents an exemplary photosensitive device to which the control method according to the invention can be applied.

FIG. 1 represents an example of a photosensitive device 10 to which the control method according to the invention can be applied. The photosensitive device 10 comprises a matrix 11 of photosensitive points, a row control circuit 12 and a set 13 of charge read circuits 131, 132 and 133. In the example of FIG. 1, the matrix 11 is formed by three rows $L_1$ to $L_3$ by three columns $C_1$ to $C_3$ of photosensitive points, referenced $P_1$ to $P_9$ individually, and $P_p$ generically. Such a matrix can obviously be formed by a greater number of photosensitive points, potentially ranging up to several million points. Moreover, the photosensitive points can also be disposed along a single column so as to form a detection linear array. Each photosensitive point $P_p$ comprises a photosensitive diode Dp and a field-effect transistor (FET) T. The photosensitive diodes could be replaced by any photosensitive element capable of converting a light radiation into electrical charges, for example a phototransistor. Moreover, a scintillator can be positioned between a source of X-radiation and the matrix 11 in order to produce an X-ray image. The transistors T are, for example, thin-film transistors, better known by the term "thin film transistors (TFT)". The photosensitive device 10 also comprises row conductors $X_1$ to $X_3$ respectively linking the outputs 121 to 123 of the row control circuit 12 to the gates of the transistors T of the first row $L_1$ of photosensitive points $P_1$ to $P_3$, to the gates of the transistors T of the second row $L_2$ of photosensitive points $P_4$ to $P_6$, and to the gates of the transistors T of the third row $L_3$ of photosensitive points $P_7$ to $P_9$. The photosensitive device 10 also comprises column conductors $Y_1$ to $Y_3$. The column conductor $Y_1$ links the drains of the transistors T of the first column $C_1$ of photosensitive points $P_1$, $P_4$ and $P_7$ to the charge reading circuit 131. The column conductor $Y_2$ links the drains of the transistors T of the second column $C_2$ of photosensitive points $P_2$, $P_5$ and $P_8$ to the charge reading circuit 132. The column conductor $Y_2$ links the drains of the transistors T of the third column $C_3$ of photosensitive points $P_3$, $P_6$ and $P_9$ to the charge reading circuit 133. In each photosensitive point $P_p$, the source of the transistor T is connected to the cathode of the photosensitive diode Dp. The anodes of all the photodiodes Dp are linked to an output 124 of the row control circuit 12. The output 124 delivers a bias voltage $V_{polar}$ that is negative in relation to the reference potential of the photosensitive device 10. The voltage $V_{polar}$ is, for example, of the order of −7 V.

The photosensitive device 10 of FIG. 1 operates in the following manner. In a phase of acquisition of an image, the matrix 11 is exposed to a stream of photons. The photons are converted into electrical charges at each photosensitive point $P_p$ by the photodiode Dp. The quantity of electrical charges is proportional to the number of photons received by the photodiode Dp. The transistors are in the off state, such that the electrical charges build up in each photosensitive point $P_p$ at the point of connection between the photodiode Dp and the transistor T. The result of this is a lowering of potential of this point of connection, called "floating point". The electrical charges built up in each photosensitive point must then be read in order to be able to restore an image in two dimensions of the stream of photons received by the matrix 11. The reading of the electrical charges of the photosensitive points $P_p$ is performed row by row, simultaneously for all the photosensitive points of one and the same row. To this end, in a reading phase, the row control circuit 12 applies to each row conductor $X_1$-$X_3$ addressed a reading pulse switching the transistors T of the row addressed to the on state. The floating points of the addressed row then revert to their bias potential, which causes a current proportional to the quantity of charges built up at the corresponding floating point to circulate in each column conductor $Y_1$ to $Y_3$. The charge reading circuits 131 to 133 use these currents in order to determine the quantity of photons received by each photosensitive point $P_p$ of the row addressed.

The invention relies on an intrinsic property of the transistors, namely the presence of a stray coupling capacitance that naturally exists in the off state between the drain and the source of a field-effect transistor, as between the collector and the emitter of a bipolar transistor. This stray coupling capacitance is relatively weak, for example of the order of 10 femtofarad ($10^{-15}$ farad), but nevertheless sufficient to generate a variation of the potential of the column conductors. "Capacitive coupling effect" should be understood to mean a variation of potential of the floating point of each photosensitive point $P_p$ connected to a column conductor $Y_1$-$Y_3$ results in a proportional variation of the potential of this column conductor $Y_1$-$Y_3$. Thus, the variation of the potential of a column conductor $Y_1$-$Y_3$ is proportional to the sum of the potential variations of the floating point of all the photosensitive points Pp connected to this column conductor $Y_1$-$Y_3$. In FIG. 1, the stray coupling capacitance of each transistor T is represented by a capacitor C, a first electrode of which is connected to the floating point (point of connection between a photodiode Dp and the associated transistor T) of the photosensitive point $P_p$ considered and a second electrode of which is connected to the column conductor $Y_1$-$Y_3$ to which the photosensitive point $P_p$ is linked. It should be noted that this stray coupling capacitance could be reinforced by the presence of a capacitor connected in parallel, that is to say connected between the drain and the source of each transistor T.

Figure 2:
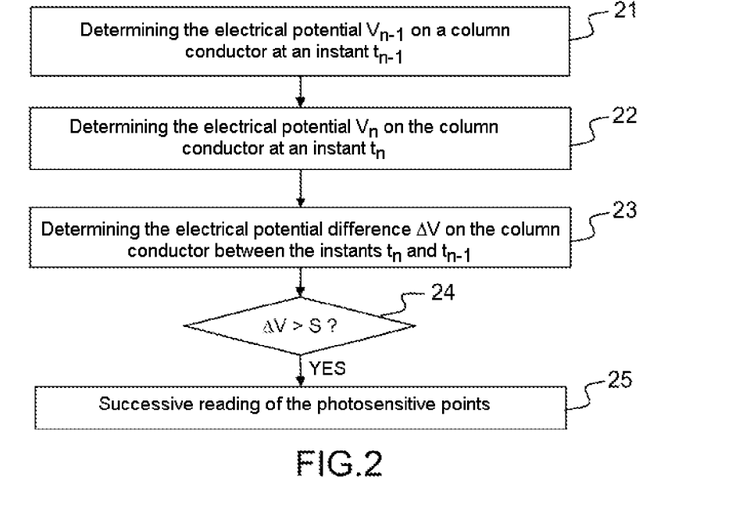
FIG. 2 represents the main steps of the control method according to the invention.

FIG. 2 represents possible steps of the control method that is the subject of the invention. This method applies, for example, to the photosensitive device 10 of FIG. 1. In a first step 21, a first test is performed: the electrical potential $V_{n-1}$ of one of the column conductors $Y_1$ to $Y_3$ is determined at a first instant $t_{n-1}$. In a second step 22, a second test is performed: the electrical potential $V_n$ of the same column conductor $Y_1$-$Y_3$ is determined at a second instant $t_n$. A test, that is to say the determination of the electrical potential of a column conductor $Y_1$-$Y_3$, is performed by means of the charge reading circuit 131-133 associated with the column conductor $Y_1$-$Y_3$ concerned. The electrical charges present on the column conductor are read and converted into a digital value representative of the electrical potential of the column conductor. In a third step 23, the electrical potential difference $\Delta V$ ($V_n$-$V_{n-1}$) of the column conductor $Y_1$-$Y_3$ between the instants $t_n$ and $t_{n-1}$ is determined. In a fourth step 24, this potential difference $\Delta V$ is compared to a predetermined threshold S. Depending on the result of this comparison, a reading step 25 is or is not initiated. In particular, if the potential difference $\Delta V$ is greater than the threshold S, a reading phase is executed, the rows $L_1$ to $L_3$ of photosensitive points $P_p$ being read in succession by the application of a reading pulse to each of the row conductors $X_1$ to $X_3$. The determination of the threshold S results from a trade-off between two conflicting requirements. According to a first requirement, the threshold S must not be too weak in order to avoid the execution of a reading phase even though the matrix 11 has not been exposed to a stream of photons. In practice, even in the absence of exposure, a potential difference of a column conductor $Y_1$-$Y_3$ can be observed by virtue of the noise introduced by the different electronic components, notably by the charge reading circuit 131-133 when determining the potential. Conversely, the threshold S must not be too high in order to avoid missing a phase of acquisition of an image.

Figure 3:
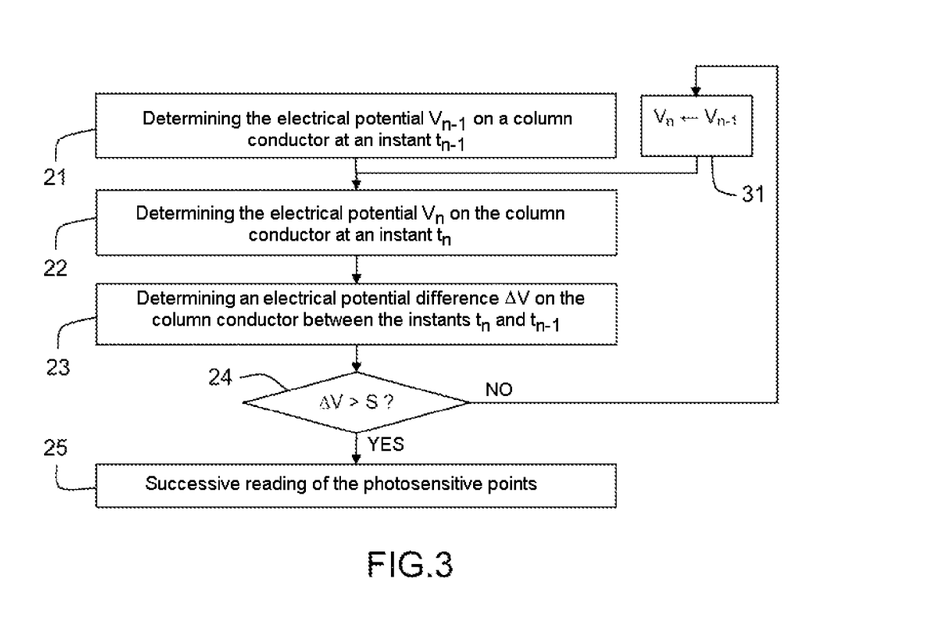
FIG. 3 represents the steps of the control method according to a first particular embodiment of the invention in which an electrical potential is read periodically as long as it has not changed significantly.

FIG. 3 represents a particular embodiment of the invention that makes it possible to permanently check the arrival of photons on the matrix 11 of the photosensitive device 10. The photosensitive device 10 is in a standby mode, that is to say that tests are performed at regular time intervals. The duration $T_v$ of each time interval is, for example, of the order of a few milliseconds or a few tens of milliseconds. This duration $T_v$ can be set in such a way as to be less than the minimum exposure time, that is to say the minimum time during which the photosensitive device 10 is likely to be exposed to a photon stream. Such a condition is, for example, necessary when, during the acquisition phase, the charge reading circuits cause the electrical potential to slowly drift on the column conductor to which they are connected. It is then necessary to compare the electrical potential on a column conductor between an instant when the photosensitive device 10 is not exposed to a photon stream, and an instant when it is actually exposed to a photon stream. The potential difference $\Delta V$ determined in the step 23 is the difference between the electrical potential $V_n$ of a column conductor $Y_1$-$Y_3$ determined during the last test at the instant $t_n$ and the potential $V_{n-1}$ determined in the last but one test at the instant $t_{n-1}$. In FIG. 3, the repetition of the tests is performed by a loop comprising the steps 22, 23 and 24, and an additional step 31 closing the loop. The step 31 is performed on completion of the step 24 if the potential difference $\Delta V$ is not greater than the threshold S. In this step 31, the potential $V_n$ becomes the potential $V_{n-1}$. On completion of the step 31, a new test step 22 is performed in which a new potential $V_n$ is determined. Thus, this potential $V_n$ can be compared in the step 23 to the new potential $V_{n-1}$ determined in the preceding step 22.

Figure 4:
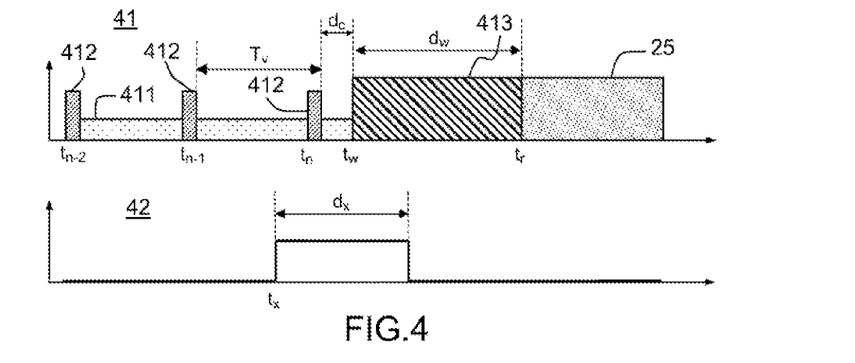
FIG. 4 represents an example of the time sequencing of the steps of the control method according to the first particular embodiment of the invention.

FIG. 4 represents, by two timing diagrams, the sequencing in time of the different steps of the control method. A first timing diagram 41 represents the operation of the photosensitive device 10. A second timing diagram 42 represents the operation of the source of photons or of X-rays. The photosensitive device 10 is in the standby mode 411 between instants $t_{n-2}$ and $t_w$. During this standby mode 411, tests 412 are performed at different instants $t_{n-2}$, $t_{n-1}$ and $t_n$. The duration $T_v$ separates the successive tests. After each test 412, the potential difference $\Delta V$ between the last two tests is determined and compared to the threshold S. In this case, after the instant $t_{n-1}$, the potential difference $\Delta V$ is insufficient to trigger a reading phase. A new test is then performed at the instant $t_n$. At an instant $t_x$, preceding the instant $t_n$, a stream of photons or of X-rays begins to be emitted by the source toward the photosensitive device 10. The emission time is denoted $d_x$. Thus, in the step 24 following the test 412 at the instant $t_n$, it is determined that the potential difference $\Delta V$ is greater than the threshold S. A reading step 25 must therefore be triggered. First, a waiting step 412 is performed from the instant $t_w$. This instant $t_w$ has a duration $d_c$ after the instant $t_n$, the duration $d_c$ being the processing time of the steps 23 and 24. The waiting step 413 is performed for a duration $d_w$, until an instant $t_r$. It makes it possible to check that the emission of photons or of X-rays is terminated at the moment of the reading phase. In practice, the reading of the photosensitive points during their exposure would give a very degraded image. Furthermore, in the case of X imaging, only a part of the X-radiation received by the patient would be used. The duration $d_w$ must therefore be greater than the maximum exposure time, that is to say the maximum duration for which the photosensitive device 10 is likely to be exposed to a photon stream. On completion of the waiting step 413, the reading step 25 can be executed.

In order to reduce the impact of the electronic noise introduced by the components of the photosensitive device 10, the method according to the invention can be optimized in different ways. In a first variant, account is taken of the potential difference of several—even all—of the column conductors $Y_1$-$Y_3$, and not only one of them. To this end, steps 21 to 23 can be performed for each column conductor $Y_1$ to $Y_3$. The step 24 can, for example, consist in comparing the sum of the potential differences on all of the column conductors $Y_1$ to $Y_3$ with an overall threshold. It can also consist in individually comparing the potential difference of the column conductors to a threshold, a reading phase being executed only if the number of positive comparisons, that is to say the number of potential differences greater than the threshold, is greater than a given number. The column conductors concerned can be adjacent or not. In a second variant of reduction of the impact of the electronic noise, the potential of the column conductor or conductors $Y_1$-$Y_3$ is determined a number of times in succession for one and the same test. An average value of the potential is then determined for each column conductor $Y_1$-$Y_3$ concerned. The potential difference $\Delta V$ determined in the step 23 is then the difference between the average value of the electrical potential $V_n$ determined in the last test at the instant $t_n$ and the average value of the electrical potential $V_{n-1}$ determined in the second to last test at the instant $t_{n-1}$.

The control method according to the invention enables a photosensitive device comprising a matrix of photosensitive point to be synchronized autonomously, independently of the source of photons or of X-rays. In the medical imaging field, where the photosensitive devices can be incorporated in movable cassettes, it becomes possible to replace any photosensitive device, notably the radiological film cassettes or the cassettes comprising means of synchronization with the source of X-radiation, without modifying the interface of the system. Furthermore, the control method does not require the addition of hardware components to the photosensitive device or to the source of photons or of X-rays. Unlike the solutions in which a device with ionization chamber is placed in the input plane of the photosensitive device, the control method according to the invention does not degrade the quality of the signal which arrives on the matrix.

Figure 5:
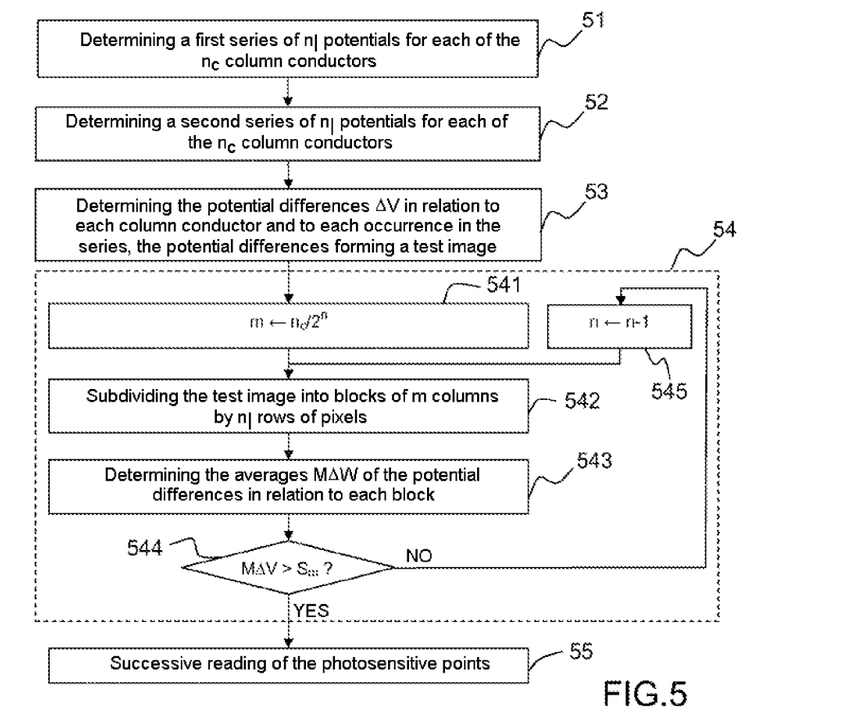
FIG. 5 represents the steps of the control method according to a second particular embodiment of the invention in which the electrical potential is read several times on several column conductors.

FIG. 5 represents a particular embodiment of the control method according to the invention. This embodiment applies to photosensitive devices comprising a number of column conductors. It relies on the one hand on the taking into account of the electrical potential on all of the column conductors and, on the other hand, on a repeated determination of these electrical potentials for one and the same test. For the rest of the description, a photosensitive device comprising $n_c$ column conductors will be considered, that is to say with $n_c$ columns of photosensitive points $P_p$.

In a first step 51, the electrical potential is determined $n_l$ times in succession on each of the $n_c$ column conductors. These $n_l \times n_c$ potentials are determined in a first time interval during an acquisition phase, that is to say in a time interval when the transistors T of the photosensitive device are controlled in the off state. These potentials form, for each column conductor, a first series of potentials. They are denoted $V_{1,i,j}$ in which 1 designates the first series of potentials, i is an integer between 1 and $n_l$ and designates the occurrence in the first series, and j is an integer between 1 and $n_c$ and designates one of the column conductors.

In a second step 52, the electrical potential is once again determined $n_l$ times in succession on each of the $n_c$ column conductors. These $n_l \times n_c$ potentials are determined in a second time interval, still during the acquisition phase. They form, for each column conductor, a second series of potentials. The potentials of the first and of the second series are respectively denoted $V_{1,i,j}$ and $V_{2,i,j}$, in which i is an integer between 1 and $n_l$ and designates the occurrence in the series concerned, and j is an integer between 1 and $n_c$ and designates one of the column conductors.

In a third step 53, potential differences $\Delta V_{i,j}$ between the electrical potentials $V_{1,i,j}$ of the first series and the corresponding electrical potentials $V_{2,i,j}$ of the second series are determined. A potential difference is determined in relation to each column conductor j and to each occurrence i in the series of potentials. In particular, for each column conductor, a difference $\Delta V_{1,j}$ is determined between the first potential $V_{1,1,j}$ of the first series and the first potential $V_{2,1,j}$ of the second series, between the second potential $V_{1,2,j}$ of the first series and the second potential $V_{2,2,j}$ of the second series, and so on for all the occurrence i of the two series of potentials. All these potential differences can be represented in the form of a test image of $n_c$ columns by $n_l$ rows of pixels, each row of the test image corresponding to an occurrence i in the series of potentials, the columns corresponding to the column conductors j of the photosensitive device. The value of each pixel of the test image is equal to the potential difference $\Delta V_{i,j}$ for the occurrence i and the column conductor j concerned.

Figure 6:
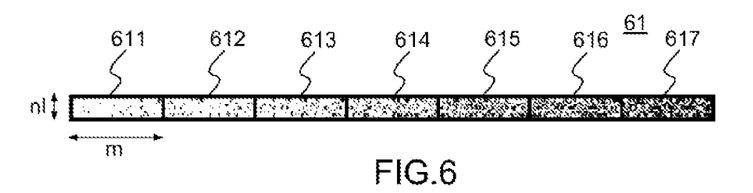
FIG. 6 represents an example of a test image obtained by the control method according to the second particular embodiment of the invention, said image being subdivided into blocks.
Figure 7:
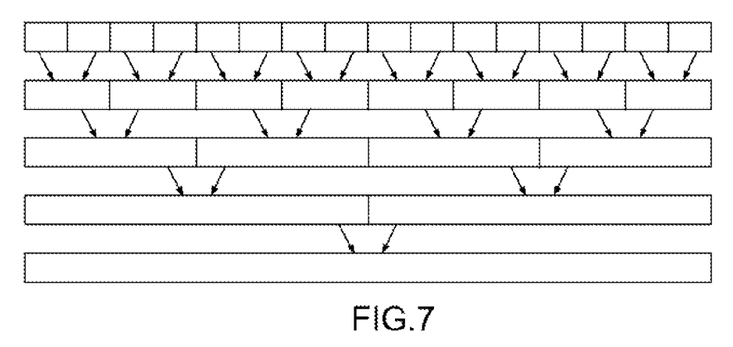
FIG. 7 illustrates the principle of a pyramidal detection according to the second particular embodiment of the invention.

In a fourth step 54, the exposure of the photosensitive points is tested. This step 54 comprises the following substeps. In a first substep 541, a variable m is initialized with a predetermined integer value. The photosensitive devices generally comprise a number of columns equal to a power of two. The variable m is then advantageously set by the relationship $m = n_c/2^n$, where n is an integer greater than or equal to 1. The value of the integer n is discussed below. In a second substep 542, the test image is subdivided into blocks of $n_l$ rows by m columns of pixels. The variable m thus defines a dimension of the blocks. FIG. 6 represents an exemplary test image 61 subdivided into seven blocks denoted 611 to 617. In a third substep 543, an average $M\Delta V_j$ of the potential differences $\Delta V_{i,j}$ is determined for each block. In a fourth substep 544, each average $M\Delta V_j$ is compared to a predetermined threshold $S_m$. This threshold $S_m$ is determined as a function of the dimension m. If none of the averages $M\Delta V_j$ is greater than the threshold $S_m$, the step 54 is repeated with a dimension m greater than the dimension m considered previously. The increase in the dimension m is represented by a substep 545 performed instead of the substep 541 of initialization of the dimension m. When the dimension m is set by the relationship $m = n_c/2^n$, the dimension m of the blocks can be increased by reducing the value of the integer n, for example by one unit. It is then possible to speak of pyramidal detection, the dimension m of the blocks being doubled on each substep 545. FIG. 7 illustrates the principle of pyramidal detection. The advantage of this detection is that the average $M\Delta V_j$ of each block of a given level can be obtained by the average of the two blocks of the preceding level. If, in the substep 544, at least one of the averages $M\Delta V_j$ is greater than the threshold $S_m$, a reading step 55 is triggered. This step 55 consists, as previously, in successively reading the different rows of photosensitive points $P_p$ by the application of a reading pulse to each of the row conductors.

Figure 8:
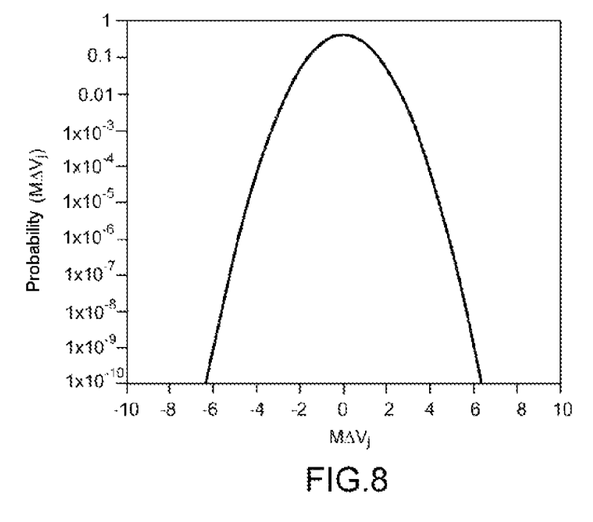
FIG. 8 graphically represents an example of probability of occurrence of averages of a block corresponding to an unexposed zone of the photosensitive device of FIG. 1.

The rest of the description illustrates the impact of the dimension m on the false alarm rate and on the rate of non-detection. "False alarm" should be understood to mean the fact that a reading step 55 is triggered although the photosensitive device has not been exposed. "Non-detection" should be understood to mean the fact that a reading step 55 is not triggered although the photosensitive device has been exposed. It is considered that each pixel of the test image, that is to say each column of the photosensitive device, is subject to an electronic noise of standard deviation s, for example equal to 8.2 lsb, where lsb is the acronym for "least significant bit", 1 lsb being the smallest voltage variation that can be discretized on a column conductor. Statistically, the noise of a pixel in a test image follows a normal law of variance $2 \cdot s^2$. For a block corresponding to an unexposed zone of the photosensitive device, the average of the pixels of the block follows a normal law of zero average and of variance $2 \cdot s^2/(n_l \cdot m)$. FIG. 8 illustrates, by a graph, an example of probability of occurrence of the averages $M\Delta V_j$ of a block corresponding to an unexposed zone. In this example, an electronic noise of standard deviation s equal to 8.2 lsb, a dimension m equal to 50 and a number $n_l$ of rows equal to 3 are considered. Thus, a block of dimension 3×50 corresponding to an unexposed zone has one chance in 10 000 of having an average $M\Delta V_j$ equal to 4. From this graph, it is possible to determine a detection threshold $S_m$ as a function of the desired false alarm rate. The following assumptions are considered by way of example. A test, that is to say the determination of a series of potentials $V_{i,j}$, is performed every 100 milliseconds (ms). The objective is to obtain a single false alarm in ten years of operation. Over these ten years, the number of tests is equal to $(10 \times 365 \times 24 \times 60 \times 60 \times 10 =) 3.2 \times 10^9$. The false alarm rate must therefore be equal to $3.2 \times 10^{-10}$. The graph makes it possible to determine a detection threshold $S_m$ equal to 6.4. A block whose average $M\Delta V_j$ is greater than 6.4 is therefore considered to correspond to an exposed zone with a false alarm rate equal to $3.2 \times 10^{-10}$.

Figure 9:
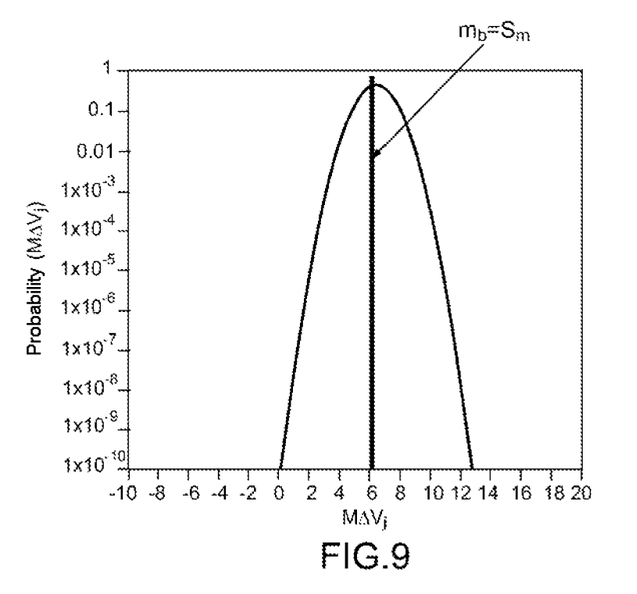
FIG. 9 graphically represents an example of probability of occurrence of the averages of a block corresponding to an exposed zone of the photosensitive device.

A block corresponding to an exposed zone of the photosensitive device is now considered. This block is subject to the same statistical law as a block corresponding to an unexposed zone, but with a statistical average $m_b$ which depends on the photon stream received. FIG. 9 illustrates, by a graph, an example of probability of occurrence of the averages $M\Delta V_j$ of a block corresponding to an exposed zone with a statistical average $m_b$ equal to the detection threshold $S_m$. As illustrated by FIG. 9, there are as many chances that the average $M\Delta V_j$ is less than the detection threshold $S_m$ as it is greater than this threshold.

Figure 10:
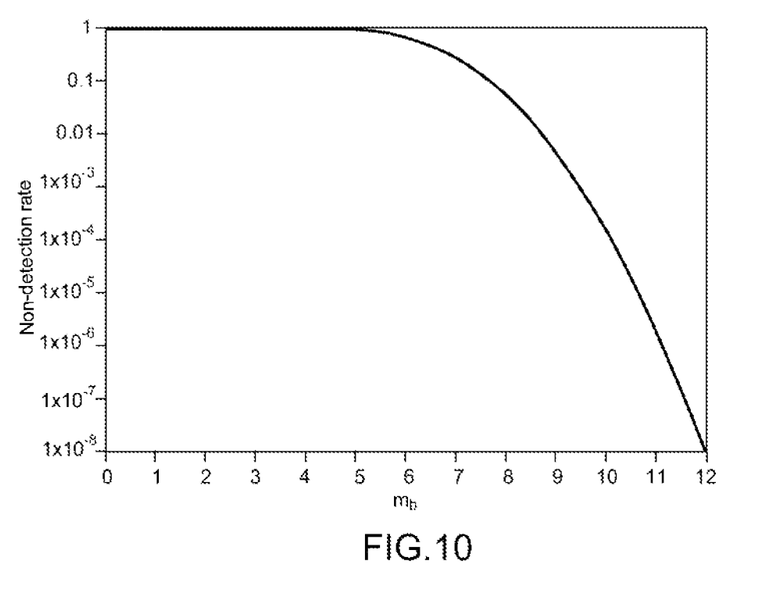
FIG. 10 graphically represents an example of non-detection rate as a function of the average of a block.

FIG. 10 represents, by a graph, an example of non-detection rate as a function of the average $m_b$ of a block. The graph makes it possible to determine that, for an exposure giving an average $m_b$ equal to 8 lsb, the probability of detection is equal to 95%. This means that, over 100 blocks tested with an average of 8 lsb, five blocks would not be detected. Such a non-detection rate is not always acceptable, notably when a patient is subjected to an X-radiation. The following assumptions are considered by way of example. An exposure takes place every 20 minutes. The dimension m of the blocks is equal to 50 and the number $n_c$ of column conductors is equal to 2880. An electronic noise of standard deviation s equal to 8.2 lsb is still considered. The objective is to miss only one exposure every ten years. The desired non-detection rate is therefore $(1/(10 \times 365 \times 24 \times 60 \times (1/20) \times (2880/50)=)\ 6.6 \times 10^{-8}$. The average $M\Delta V_j$ of the corresponding block is, for example, equal to 11.5 lsb. To sum up, a block whose average $M\Delta V_j$ is equal to 11.5 lsb is considered to correspond to an exposed zone with a non-detection rate equal to $6.6 \times 10^{-8}$. Thus, the photosensitive device must be at least exposed to a flow such that the average $M\Delta V_j$ of a block is equal to 11.5 lsb for the photosensitive device to be considered to have been exposed to a radiation with a non-detection rate equal to $6.6 \times 10^{-8}$. This detectable minimum average is denoted $M_d$. The detectable minimum average $M_d$ is a function of the dimension m of the blocks.

Figure 11:
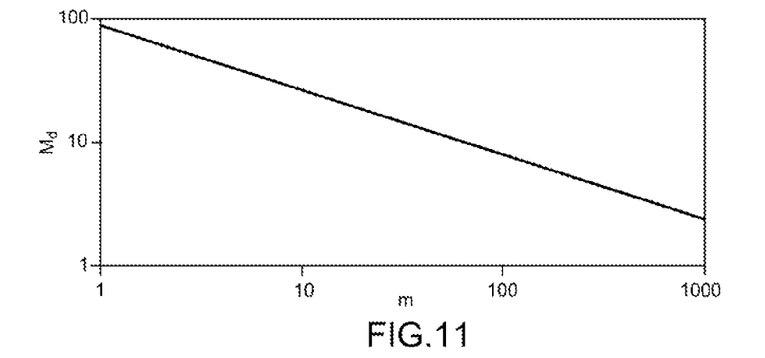
FIG. 11 graphically represents the relationship between a dimension of a block and a minimum average of this block that can be detected with a given non-detection rate.

FIG. 11 illustrates, by a graph, the relationship between the dimension m of a block and the detectable minimum average $M_d$. This graph shows that the wider the blocks become, the lower the detectable minimum average $M_d$ becomes.

Figure 12:
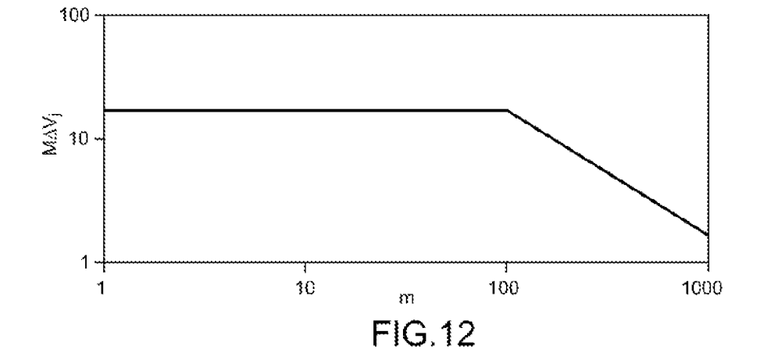
FIG. 12 graphically represents the relationship between the dimension of a block and the average of this block for an exposure on a given surface of the photosensitive device.

Moreover, a photosensitive device is not necessarily exposed over all the surface of its matrix. Thus, for a given exposure, only some of the column conductors can be linked to photosensitive points that have received a radiation. The dimension m of the blocks must therefore also take account of the exposed zones of the matrix. As an example, an exposure on a surface of 100×100 photosensitive points is considered. For the purposes of simplification, the blocks are still considered to be centered on this surface. FIG. 12 illustrates, by a graph, the relationship between the dimension m of a block, and the average $M\Delta V_j$ of a block corresponding to such an exposure. If the dimension m of the block centered on the exposed zone is less than or equal to the width of the exposed surface, the average $M\Delta V_j$ of this block remains constant. On the other hand, if the dimension m of the block becomes greater than the width of the exposed surface, the average $M\Delta V_j$ of the block decreases.

Figure 13:
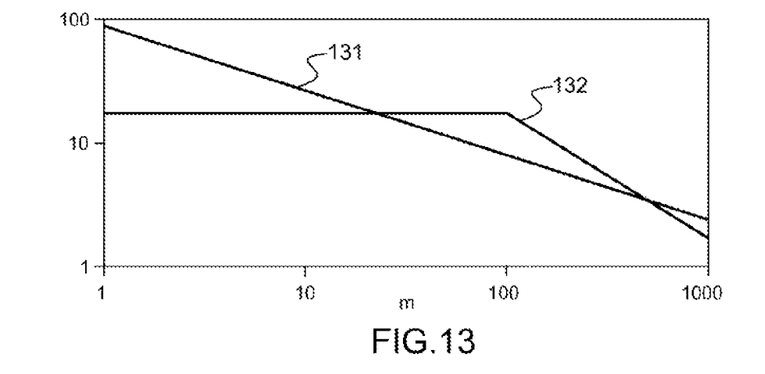
FIG. 13 brings together, in one and the same graph, the graphs of FIGS. 11 and 12.

FIG. 13 combines the two graphs of FIGS. 11 and 12 in a single graph. A first curve 131 represents the detectable minimum average $M_d$. A second curve 132 represents the average $M\Delta V_j$. The curves 131 and 132 show that, for an exposure over a width of 100 columns with an approximate average $m_b$ equal to 17 lsb, a block centered on the exposure zone is detected as corresponding to an exposure zone with a non-detection rate of $6.6 \times 10^{-8}$ if, and only if, its dimension m is between 25 and 450. Moreover, a detection optimum appears for a dimension m equal to the width of the exposure. However, this exposure width is not generally known. Now, in some imaging fields, the exposed surface can vary enormously between the different exposures. Consequently, a single dimension m does not make it possible for the photosensitive device to detect exposures of any width. The test step 54 of the exposure of the photosensitive points therefore enables the photosensitive device to adapt the dimension m of the blocks to the actual width of the exposure.

Figure 14:
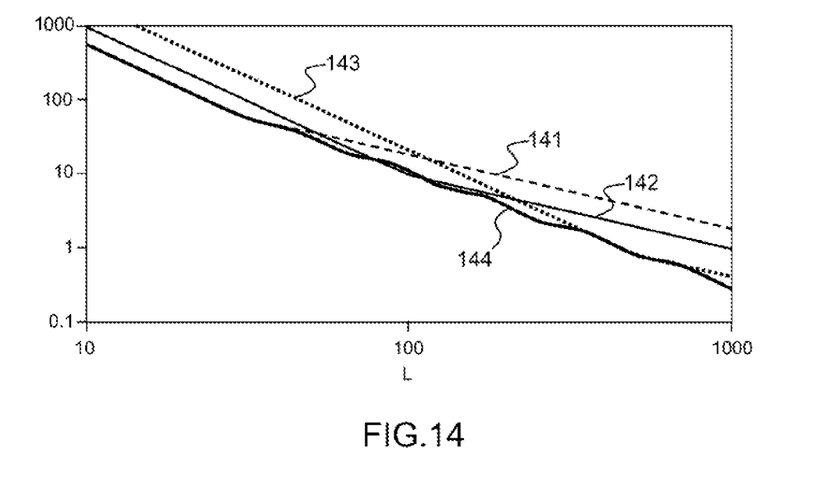
FIG. 14 illustrates the effect of a variation of the dimension of the blocks on the detection of an exposure of the photosensitive device.

FIG. 14 illustrates the effect of the variation of the dimension m of the blocks on the detection of an exposure. It represents, by a graph, the detectable minimum average $M_d$ as a function of the width L of the exposed zone for different block dimensions m. A first curve 141 represents the detectable minimum average $M_d$ for a dimension m equal to 30. A second curve 142 represents the detectable minimum average $M_d$ for a dimension m equal to 100. A third curve 143 represents the detectable minimum average $M_d$ for a dimension m equal to 500. Finally, a fourth curve 144 represents the detectable minimum average $M_d$ for a dimension m that successively takes the values 32, 64, 128, 256, 512 and 1024. The curves 141 to 144 show that the variation of the dimension m of the blocks allows an optimal detection regardless of the width of the exposed zone.

The stray coupling capacitance of the transistors of a matrix of photosensitive points can be used in a similar manner in order to measure the quantity of photons or of X-rays received by the photosensitive device. In practice, the variation of potential of the floating points, and therefore of the column conductors, is proportional to the quantity of photons or of X-rays received. By performing a number of tests to determine the potential on the column conductors during the acquisition phase, it is possible to deduce therefrom the quantity of photons or of X-rays received. This radiation quantification function can notably be used to servocontrol the emission power of the stream of photons or of X-rays, or to interrupt the emission once the desired quantity of photons or of X-rays has been received.

The invention claimed is:

1. A method for controlling a photosensitive device comprising a column conductor ($Y_1$-$Y_3$), row conductors ($X_1$-$X_3$) and photosensitive points ($P_p$), each photosensitive point ($P_p$) being linked between the column conductor ($Y_1$-$Y_3$) and one of the row conductors ($X_1$-$X_3$), and comprising a photosensitive element (Dp) suitable for converting a photon stream into electrical charges, and a transistor (T) controlled by the corresponding row conductor ($X_1$-$X_3$), the transistors (T) being controlled in the off state during an acquisition phase in which the photon stream is converted into electrical charges, and being successively controlled in the on state during a reading phase so as to transfer, row by row, the electrical charges to the column conductor ($Y_1$-$Y_3$), each transistor (T) introducing, in the off state, a stray coupling capacitance (C) between the corresponding photosensitive element ($P_p$) and column conductor ($Y_1$-$Y_3$), the method comprising a step consisting in determining an electrical potential on the column conductor ($Y_1$-$Y_3$) at an instant ($t_{n-2}$, $t_{n-1}$, $t_n$) when the transistors (T) are controlled in the off state.

2. The method as claimed in claim 1, comprising the following additional steps:
   determining the electrical potential on the column conductor ($Y_1$-$Y_3$) at a second instant ($t_n$) when the transistors (T) are controlled in the off state,
   determining a difference in the electrical potential on the column conductor ($Y_1$-$Y_3$) between the first and second instants,
   comparing the electrical potential difference with a predetermined threshold,
   if the electrical potential difference is greater than the predetermined threshold, successively controlling the transistors (T) so as to individually transfer the electrical charges of each photosensitive point ($P_p$) to the column conductor ($Y_1$-$Y_3$).

3. The method as claimed in claim 2, in which the step consisting in determining the electrical potential on the column conductor ($Y_1$-$Y_3$) is repeated periodically as long as the potential difference between the last two determination instants is not greater than the predetermined threshold, the step of controlling the transistors (T) then being executed.

4. The method as claimed in claim 3, in which the duration ($T_v$) of the period between two successive determinations of the potential on a column conductor is less than a minimum duration ($d_x$) during which the photosensitive device is likely to be exposed to a photon stream.

5. The method as claimed in claim 2, in which the threshold is determined in such a way as to avoid the execution of the step of controlling the transistors (T) in the absence of exposure of the photosensitive elements ($P_p$) to a photon stream, and in such a way as to avoid the non-execution of the step of controlling the transistors (T) after an effective exposure of the photosensitive elements ($P_p$).

6. The method as claimed in claim 2, in which the electrical potential on the column conductor ($Y_1$-$Y_3$) is determined a number of times in succession for one and the same step of determining the potential, the different potentials being averaged before determining their difference with another potential in order to reduce the noise associated with the determination of the potential.

7. The method as claimed in claim 2, in which the photosensitive device comprises a number of column conductors ($Y_1$-$Y_3$), each photosensitive point ($P_p$) being linked between one of the column conductors ($Y_1$-$Y_3$) and one of the row conductors ($X_1$-$X_3$) so as to form a matrix of photosensitive points ($P_p$), the electrical potential being determined in each corresponding step on a number of column conductors ($Y_1$-$Y_3$), the step of determining the potential difference being executed for each of said column conductors ($Y_1$-$Y_3$), and the step of comparing the potential difference with the predetermined threshold taking into account all of the potential differences.

8. The method as claimed in claim 7, in which the step of comparing the potential differences comprises the individual comparison of each potential difference with the predetermined threshold, the step of controlling the transistors (T) being executed only if the number of positive comparisons is greater than a predetermined number.

9. The method as claimed in claim 2, in which the step of controlling the transistors (T) is preceded by a waiting step, a duration of the waiting step being greater than a maximum duration ($d_x$) during which the photosensitive device is likely to be exposed to a photon stream.

10. The method as claimed in claim 1, comprising the following additional steps:
    determining the electrical potential on the column conductor ($Y_1$-$Y_3$) at a second instant ($t_n$) when the transistors (T) are controlled in the off state,
    determining a difference in the electrical potential on the column conductor ($Y_1$-$Y_3$) between the first and second instants,
    determining the quantity of photons received by the photosensitive device as a function of the potential difference.

11. The method as claimed in claim 1, in which the photosensitive device comprises $n_c$ column conductors ($Y_1$-$Y_3$), each photosensitive point ($P_p$) being linked between one of the column conductors ($Y_1$-$Y_3$) and one of the row conductors ($X_1$-$X_3$) so as to form a matrix of photosensitive points ($P_p$), the electrical potential being determined $n_l$ times in succession on each of the column conductors ($Y_1$-$Y_3$) in a first time interval when the transistors (T) are controlled in the off state, the potentials forming a first series of potentials for each column conductor,
    the method comprising the following additional steps:
        determining the electrical potential $n_l$ times in succession on each of the column conductors ($Y_1$-$Y_3$) in a second time interval when the transistors (T) are controlled in the off state, the potentials forming a second series of potentials for each column conductor,
        determining, in relation to each column conductor and to each occurrence in the series of potentials, a potential difference between the electrical potential of the first series and the corresponding electrical potential of the second series, the potential differences forming a test image of $n_c$ columns by $n_l$ rows of pixels, testing the exposure of the photosensitive points, said step comprising the following successive substeps:

subdividing the test image into blocks of m columns by $n_l$ rows of pixels, determining for each block, an average of the potential differences, comparing each average with a predetermined threshold that is a function of the dimension m of the blocks, if no average is greater than the predetermined threshold, repeating the test step with a block dimension m greater than the preceding dimension m, if at least one average is greater than the predetermined threshold, successively controlling the transistors (T) so as to individually transfer the electrical charges of each photosensitive point ($P_p$) to the corresponding column conductor ($Y_1$-$Y_3$).

12. The method as claimed in claim 11, in which the dimension m of the blocks is determined in such a way that the test image is subdivided a first time into $2^n$ blocks, with n being an integer greater than or equal to 1, the dimension m of the blocks being increased on each repetition of the test step by reducing the value of n by one unit.

* * * * *